United States Patent
Schlusser (10) Patent No.: US 8,082,327 B2
(45) Date of Patent: Dec. 20, 2011

(54) SYSTEMS METHODS AND APPARATUSES FOR PROVIDING APPLICATIONS STYLE FUNCTIONALITY TO A USER

(75) Inventor: Paul Schlusser, Collaroy (AU)

(73) Assignee: Binu Pty Ltd, Belrose, NSW (AU)

( * ) Notice: Subject to any disclaimer, the term of this patent is extended or adjusted under 35 U.S.C. 154(b) by 46 days.

(21) Appl. No.: 12/450,576

(22) PCT Filed: Apr. 2, 2008

(86) PCT No.: PCT/AU2008/000466
§ 371 (c)(1),
(2), (4) Date: Oct. 1, 2009

(87) PCT Pub. No.: WO2008/119129
PCT Pub. Date: Oct. 9, 2008

(65) Prior Publication Data
US 2010/0057840 A1 Mar. 4, 2010

(30) Foreign Application Priority Data
Apr. 2, 2007 (AU) .............................. 2007901745

(51) Int. Cl.
G06F 15/16 (2006.01)
G06F 3/00 (2006.01)

(52) U.S. Cl. ...................................... 709/219; 715/738

(58) Field of Classification Search .................. 709/203; 715/738, 744
See application file for complete search history.

(56) References Cited

U.S. PATENT DOCUMENTS

| 5,832,231 A | 11/1998 | Raman et al. |
| 6,085,226 A | 7/2000 | Horvitz |
| 6,182,133 B1 | 1/2001 | Horvitz |
| 6,211,872 B1 * | 4/2001 | Matsutsuka et al. .......... 715/744 |
| 6,397,259 B1 | 5/2002 | Lincke et al. |
| 6,584,548 B1 | 6/2003 | Bourne et al. |
| 6,618,751 B1 | 9/2003 | Challenger et al. |
| 7,007,237 B1 | 2/2006 | Sharpe |
| 7,330,890 B1 | 2/2008 | Partovi et al. |
| 7,707,453 B2 * | 4/2010 | Winokur ...................... 714/6.12 |
| 2003/0046365 A1 * | 3/2003 | Pfister et al. .................. 709/219 |
| 2006/0206589 A1 * | 9/2006 | Lentini et al. ................. 709/219 |
| 2007/0198634 A1 * | 8/2007 | Knowles et al. .............. 709/203 |
| 2008/0209362 A1 * | 8/2008 | Bardon et al. ................. 715/823 |

OTHER PUBLICATIONS

International Search report for PCT/AU2008/000466 dated Jul. 4, 2008.

* cited by examiner

*Primary Examiner* — Aaron Strange
(74) *Attorney, Agent, or Firm* — Jones Day (57) ABSTRACT

Systems configured to provide applications style functionality to at least one user, the systems comprising: at least one user device that includes at least one receiver for receiving data comprising a series of linked states plus additional data associated with each state, the additional data comprising, storage instructions and display instructions; and at least one decoder to decode the received data and cache each state and its corresponding display instructions in accordance with the storage instructions. The systems may also comprise: at least one server configured to communicate with the at least one user device that includes a processor for interpreting the execution of an application or rendering of a state and expressing it as a series of states through which the at least one user device may navigate to create the appearance of executing an application or browsing web content.

13 Claims, 4 Drawing Sheets

SYSTEMS METHODS AND APPARATUSES FOR PROVIDING APPLICATIONS STYLE FUNCTIONALITY TO A USER

CROSS REFERENCE TO RELATED APPLICATION

This application is the National Phase application of International Application No. PCT/AU2008/000466, filed 2 Apr. 2008, which claims priority to Australian Application No. 2007901745, filed 2 Apr. 2007. Each of these applications, in its entirety, is incorporated herein by reference.

BACKGROUND

1. Field of the Disclosure

The present disclosure relates to a systems, methods and apparatuses that are configured to provide applications style functionality to a user. More particularly, the present disclosure relates to systems and apparatuses that may include a mobile device and/or a server configured to communicate with the mobile device to provide applications style functionality to the user of the mobile device.

2. Description of Related Art

There are several existing methods for implementing software applications on wireless devices. These methods include browser-based applications implemented in mark-up languages such as WML and cHTML, and also stand alone or thick client applications that are typically implemented in JAVA and execute the majority of the application functionality natively within the wireless device.

A browser-based application involves the implementation of an application server that delivers mark-up languages (e.g., HTML), which are then interpreted by a general purpose browser resident on a client device. Browser based applications are relatively easy to implement but generally offer very poor interactivity with the user because of the bandwidth limitations and latency associated with wireless links. While languages such as HTML are powerful and expressive, they do not make efficient use of the bandwidth between an application server and a browser. One reason for this inefficiency is that they are designed to be human readable and as such, are generally represented using alphabetic characters.

Browser based systems suffer from many limitations including significant complexity required to implement basic functionality and extreme slowness arising from the fact that each user input requires an entire page fetch from a server.

A thick client based application involves the implementation of a client program that is fully executed on a client device. JAVA is often used as the language to implement the client software because it is ubiquitously available on wireless devices. Thick client based applications are often augmented by services provided by a ground based server to mediate connectivity to data of interest.

Client based applications are typically much more interactive than browser based applications because code can be executed on the client device which does not involve the latency of the wireless link. However, the thick client approach requires a separate application to be implemented for each new item of functionality that must be either preloaded or downloaded prior to use. The need to preload the application considerably reduces the appeal and accessibility of this approach.

A combination of the above is also possible involving the use of a mark-up language in conjunction with a scripting language. This approach is seen typically as a combination of HTML and Javascript. The combination includes the advantages of both approaches but also includes the problems of both approaches.

The present inventors have observed that it would be desirable to provide systems, methods and apparatuses that are configured to provide applications style functionality to a user to overcome some of the disadvantages of prior art systems.

SUMMARY OF THE DISCLOSURE

Exemplary embodiments of the inventions disclosed herein disclose systems configured to provide applications style functionality to a user, the systems comprising: at least one user device comprising: at least one receiver for receiving data comprising a series of linked states plus additional data associated with each state, the additional data comprising, storage instructions and display instructions; and at least one decoder to decode the received data and cache each state and its corresponding display instructions in accordance with the storage instructions; and at least one server configured to communicate with the at least one user device, the at least one server comprising: at least one processor for interpreting the execution of at least one application or rendering of a state and expressing it as a series of states through which the at least one user device may navigate to create the appearance of executing at least one application or at least one browsing web content.

In certain embodiments, the at least one processor may include at least one encoder for encoding the data so that the data comprises a series of linked display pages plus storage instructions and display instructions associated with each page; at least one transmitter for transmitting the encoded data stream for reception by at least one user device; and at least one storage device for maintaining a record of the contents of the cache constructed in the at least one user device after reception of the encoded data stream according to the storage instruction.

In exemplary embodiments, the at least one storage device may receive the details of the changes in state on the at least one user device to facilitate anticipation of future states and encode the future states into subsequent data transmissions to the at least one user device.

In exemplary embodiments, a state may be an HTML web page and subsequent states are pages to which the original page is linked (e.g., via a hypertext link). Alternatively, the state may be a small section of the original page and a subsequent state may be an adjacent area of the page. Additionally, the state may be an application or other media such as sound.

In certain embodiments, the at least one user device may be a mobile telephone or PDA and the server may be a proxy server.

In exemplary embodiments, the transmission from the server to the at least one user device may include first generation states linked to a current state.

Exemplary embodiments of the devices described herein may include a user device for providing applications style functionality to a user that includes a receiver for receiving a data stream transmission, comprising a series of linked state conditions, each state condition comprising output instructions; a processor for responding to an input or an event by moving to the device to a new state by applying output instructions; a transmitter for transmitting to a server the change in state; and a decoder for decoding the received data stream and caching each state and its output instructions in accordance with storage instructions received with each state.

The device may be configured to repeatedly move from one state to another to create the appearance of running an application.

In exemplary embodiments, the user device may be a mobile phone or a PDA.

In exemplary embodiments, a state may be an HTML web page and subsequent states are pages to which the original page is linked (e.g., via a hypertext link). Alternatively, the state may be a small section of the original page and a subsequent state may be an adjacent area of the page.

Exemplary embodiments of the devices described herein may include a server for communicating with a mobile device, the server comprising: a processor for interpreting the execution of an application or rendering of a page and express it as a series of states through which the user device may navigate to create the appearance of executing an application or browsing web content.

In exemplary embodiments, the at least one processor may comprise at least one encoder for encoding the data so that the data comprises a series of linked display pages plus storage instructions and display instructions associated with each page; at least one transmitter for transmitting the encoded data stream for reception by the user device; and a at least one storage device for maintaining a record of the contents of the cache constructed in the at least one user device after reception of the encoded data stream according to the storage instruction.

In exemplary embodiments, the at least one storage device may receive the details of the changes in state on the user device to facilitate anticipation of future states and encode the future states into subsequent data transmissions to the user device.

In exemplary embodiments, a state may be an HTML web page and subsequent states are pages to which the original page is linked (e.g., via a hypertext link). Alternatively, the state may be a small section of the original page and a subsequent state may be an adjacent area of the page.

BRIEF DESCRIPTION OF THE DRAWINGS

In order to facilitate a more detailed understanding of the nature of the inventions disclosed herein, exemplary embodiments of systems, methods and apparatuses that are configured to provide applications style functionality to a user will now be described in detail, by way of example only, with reference to the accompanying drawings in which.

DETAILED DESCRIPTION

The present disclosure relates to systems, methods and apparatuses that are configured to provide applications style functionality to a user. More particularly, the present disclosure relates to systems and apparatuses that may include a mobile device and/or a server configured to communicate with the mobile device to provide applications style functionality to the user of the mobile device. Details of certain embodiments disclosed herein are provided below with reference to FIGS. 1 and 2.

In exemplary embodiments, a wireless system comprising a user device (e.g., a mobile device) and a server (e.g., a proxy server) may be provided.

The user device may be configured to provide applications style functionality to a user. To achieve this, in exemplary embodiments, the user device may receive data comprising a series of linked states (e.g., pages) plus additional data (e.g., metadata) associated with each page. The metadata may include storage instructions and display instructions. The user device may decode the received data and cache each state and its corresponding display instructions in accordance with the storage instructions.

The server may be configured to communicate with the user device and with an applications server. In particular, the server may be configured to interpret the execution of an application or rendering of a page and express it as a series of states through which the user device may navigate to create the appearance of executing an application or browsing web content. To achieve this, the server may encode the data so that the data comprises a series of linked display pages plus metadata associated with each page (e.g., storage instructions and display instructions). The server may transmit the encoded data stream for reception by a mobile device and maintain a record of the contents of the cache constructed in the user device after reception of the encoded data stream according to the storage instruction. Additionally, the server may receive the details of the changes in state on the user device, anticipate future states and encode the future states into subsequent data transmissions to the user device.

For example, in certain exemplary embodiments, a state may be a full HTML page and subsequent states may be pages to which the original page is linked (e.g., via a hypertext link). In addition, a state may be a small section of the original page and a subsequent state may be an adjacent area of the page or the page once a dropdown list has been expanded. Furthermore, a new state may be a complete new application or output of other media such as sound.

In certain exemplary embodiments, the user device, which may be implemented as a software module, may be configured to interact with the user through the execution of a scripting language. The size of the scripting engine on the mobile device, both in terms of execution capacity and memory constraints, may, in certain embodiments, be minimal. The scripting engine may, in certain embodiments, also be very simple in its design and may be no more complex than, for example, a relatively simple key driven state machine.

The transmission from the server to the user device may, in exemplary embodiments, be continuous while a channel is open, and when the channel is not otherwise busy the server may use the open channel to transmit a first generation of states linked to the last displayed state, together with their associated metadata. This transmission may be followed by the second generation of states linked to the first generation and so on.

In exemplary embodiments, a displayed state may contain items for user selection, and the selection of an item may result in the display of a corresponding new state to the user. In situations where the new page and its associated output instructions have already been received by the user device, there will be less delay in displaying the new state after selection. In the event a user selects a display of a state that is not cached in the user device, the state will be requested and transmitted with as little delay as possible. Transmission of a user selections to the server may also be used to assist in maintaining synchronization between a cache in the user device and the record maintained at the server.

In exemplary embodiments, state selection may be achieved by the entry of words or parts of words by the user. In this case the user device or server, or both, may identify a set of possible pages that could be selected after each key stroke. This set may become smaller after each keystroke until only a single page is contained in the set and then that page will be displayed, or transmitted and displayed, without delay. In exemplary embodiments, the proxy server may also separately transmit page element data that is common to a plurality of pages, together with associated metadata and display instructions. For instance font data for text. This data may be retrieved by appropriate pages as they are being constructed, for instance to generate the text for display on the page.

In exemplary embodiments, transmissions between the server and the user device may be compressed before transmission and decompressed after reception. Additionally, in exemplary embodiments, the pages displayed to the user on the user device may have an automatic update time associated with them. In this case an application may automatically determine the next page to be displayed in the absence of user input. This feature may be used to present animations to the user where the update time is set to, for example, a video frame rate or slide show.

In exemplary embodiments, inputs by the user may be initiated via, for example, voice, touching the screen, movement of the device, instruction from another application, communication over a wireless network (e.g., Bluetooth), instructions from the server, keyboard input, etc.

In certain exemplary embodiment, a user device (e.g., a mobile device) for providing applications style functionality to a user may be configured to receive a data stream transmission, comprising a series of linked state conditions; respond to input or an event by moving to the device to new state by applying output instructions; notify a server of the change in state; and repeatedly move from one state to another to create the appearance of running an application; and decode the received data stream and cache each state and its output instructions in accordance with the storage instructions received with each state.

In certain exemplary embodiments, each state condition may contain output instructions (such as content to display on the screen) together with a list of new states that the device can move to in response to defined inputs or events.

The user device may have a keypad for user input. The number of keys may be less than total number of characters that may be required by the user, and this issue may be dealt with in a number of ways (e.g., methods that would be understood by a person of ordinary skill in the art in view of the present disclosure). For example, in certain embodiments, the keypad may selectively code to different character sets by use of "shift" functionality, or each key may represent a set of possible characters and the user's input may be determined as more keys are pressed using "autofill" functionality.

In certain embodiments, the mobile device may be a mobile phone or a PDA.

In another exemplary embodiment a server (e.g., a proxy server) for communicating with the mobile device may be configured to interpret the execution of an application or rendering of a page and express it as a series of states through which the user device may navigate to create the appearance of executing an application or browsing web content; encode a data stream to comprise a series of linked states, plus metadata associated with each page (e.g., storage instructions and display instructions); transmit the encoded data stream for reception by a user device; and maintain a record of the contents of the cache constructed in the user device after reception of the encoded data stream according to the storage directions.

In exemplary embodiments, a state may include rules to interpret the input to determine which new state to change to (e.g., rules for voice recognition, measurement of movement, etc.). Additionally, the server may be aware of the capabilities of the user device (input and output capabilities such as display size, keyboard) and may use this information to translate the application or content stream into a set of states tailored for the user device. In exemplary embodiments, a state may be encoded and transmitted in a simplified rendering to save transmission volume. More complete details of the state (for example, more detailed rendering of images) may be transmitted once the state has been entered by the device. The new details may, in exemplary embodiments, be output on the device without further input or user action.

Additionally, in exemplary embodiments, a state may be defined to contain scripting which may be executed on the user device. Some scripting may contain instructions for rendering images or produce graphic elements on the display or alternatively may perform actions on the device, perform calculations, or implement various logic from the application or web content.

In exemplary embodiments, any state may be defined in terms of any other state (not just the preceding state) plus a set of differences to that state. The differences to the referenced state can be either changes to the output, new rules for linking inputs or events to new states or new scripting. A state may be expressed in terms of a number of earlier states (with differences) to be passed through sequentially and without user input.

States can be linked as a sequence such that one input or event can trigger many changes of state. Using this linking the server can build and communicate a set of layers to the user device.

In exemplary embodiments, outputs may typically be changes to all or part of the device display but may include any output the device supports including sound, electronic transmission, movement (e.g. vibration), etc.

In addition, in exemplary embodiments, the states may be sent to more than one device and executed on each device independently. This functionality may allow the output (e.g., part or all of the display) on the devices to be synchronized. Inputs may be made through any of the devices to trigger a change of state in which case the mobile device may inform the server that the state has been changed and the server may, in exemplary embodiments, instruct the other devices to change state.

In exemplary embodiments, an area of memory on the mobile device may be dedicated to be managed by the server. The server may have complete control of this area of memory on the device. The data stream between the server and the device may include storage instructions to the mobile device regarding how to change this memory to record multiple states and other content. The mobile device may read the memory but may not make changes to the memory without instruction from the server. The server will retain a full copy of the controlled memory on the device. In addition, the server may retain a history of storage instructions built into the data stream such that if instructions to the device are lost they can be either re-transmitted or undone.

Figure 1:
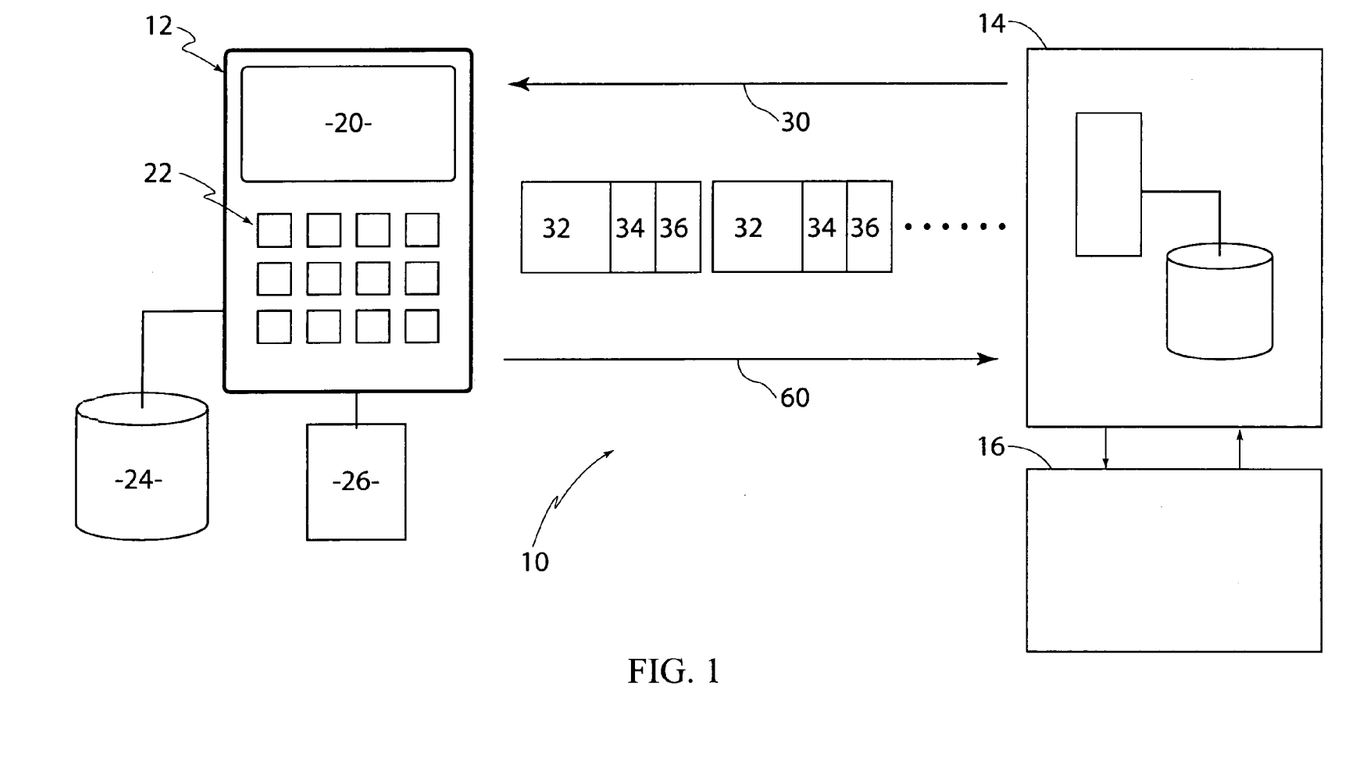
FIG. 1 is a schematic diagram of the elements of a wireless system in accordance with exemplary embodiments disclosed herein.

Referring to FIG. 1, the wireless system 10 comprises a mobile device 12, a proxy server 14 and an applications server 16. The mobile device 12 has a display 20 for the user to read, and a keypad 22 for the user to make entries. Internally the mobile device 12 has a cache 24 in which it stores the code received from the proxy server 14. The mobile device may also have a scripting engine 26 capable of executing scripting code.

The proxy server 14 receives applications transmissions from the applications server 16 in a mark-up language. The received applications functionality is divided into a first part for execution by the proxy server. A second part of the applications functionality is encoded into scripting code for execution by the mobile device 12. The code is then transmitted to the mobile device 12. The proxy server 14 may be able to communicate with many mobile devices and applications servers simultaneously.

The scripting codes are then transmitted from the proxy server 14 to the mobile device 12. This transmission 30 is generally part of a continuous streaming transmission between the proxy server and the mobile device and may comprise a series of linked display states 32 each of which is accompanied by metadata that includes storage instructions 34 and display instructions 36.

The storage instruction 34 may include a unique cache reference that defines where the associated state 32 is to be stored in cache 24. The proxy server 14 keeps a record of these cache references and so maintains knowledge of the contents of the cache 24.

Figure 2:
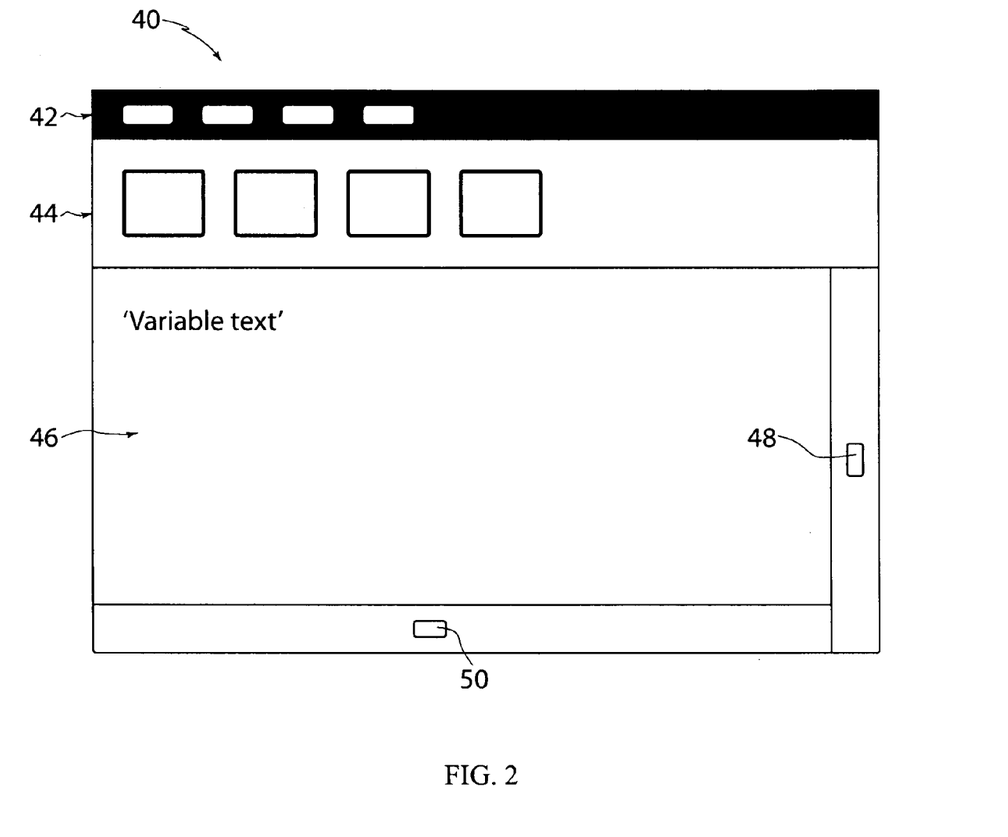
FIG. 2 is a schematic diagram of a browser application in accordance with exemplary embodiments disclosed herein.

The display instructions 36 include instructions to retrieve data from selected cache references and build a page for display on the mobile device. These instructions may cause a new display page to be built from scratch, but are more likely to update the currently displayed page with small changes. For instance, if the currently displayed page is a browser window 40, as shown in FIG. 2, the top bar 42 may comprise drop down menu items, the next bar 44 may comprise navigation buttons and the main frame 46 may have vertical 48 and horizontal 50 scroll bars and some text or images displayed in it. From one page to another the only part of the display that changes might be some of the text in frame 46.

Accordingly, the display instructions to cause such a new page to be displayed include directions to retrieve selected letters of a font stored in cache and to overwrite existing locations in the frame with those letters. As a result of reading the new text the user may make a further selection using keyboard 22 which might cause a further change in text. Alternatively the user entry might cause a more significant change to the display.

The system operates to reduce (or minimize) delays for the user between each display state, and it does this by loading pages and page elements into the cache (e.g., intermittently or continuously) when the communications channel is open between the mobile device and the proxy server. In particular new pages might be uploaded while the user is reading the text displayed in the current page. The pages that are uploaded will generally be those most likely to be selected for display next. For instance, if the user is reading a page in an application that is linked to five other pages those five pages might be uploaded.

The order in which they are uploaded might be determined by the historical frequency of their selection, or an algorithm operating at the proxy server (or mobile device) that takes account of the user's past behavior. Each of the five pages in the next generation may be linked to pages of another generation, and once the five pages are uploaded the next generation may be loaded.

Although, each page in this embodiment represents a single state, in exemplary embodiments, a plurality of pages may be used to represent states or a plurality of states can be defined based on a single page.

As the cache contents increase it becomes more likely that a particular user selection will be satisfied locally by the mobile device retrieving the page update or new page from cache, and not requiring transmission of the user selection to the proxy server, and the return of new pages from the proxy server. Of course, in exemplary embodiments, use of the "back" browsing function may always be satisfied from local cache.

When the proxy server is not uploading new generations of states it may upload library data that contains state elements, such as new fonts, images or other material that is expected to be useful at some point in the future.

Using this functionality described herein, an exemplary system may be able to support a wide range of different applications such as, for example, email, searching, navigation; streaming information; viral marketing; interactive TV; chat and meeting applications; entertainment guides; and/or secure transactions, etc.

Figure 3:
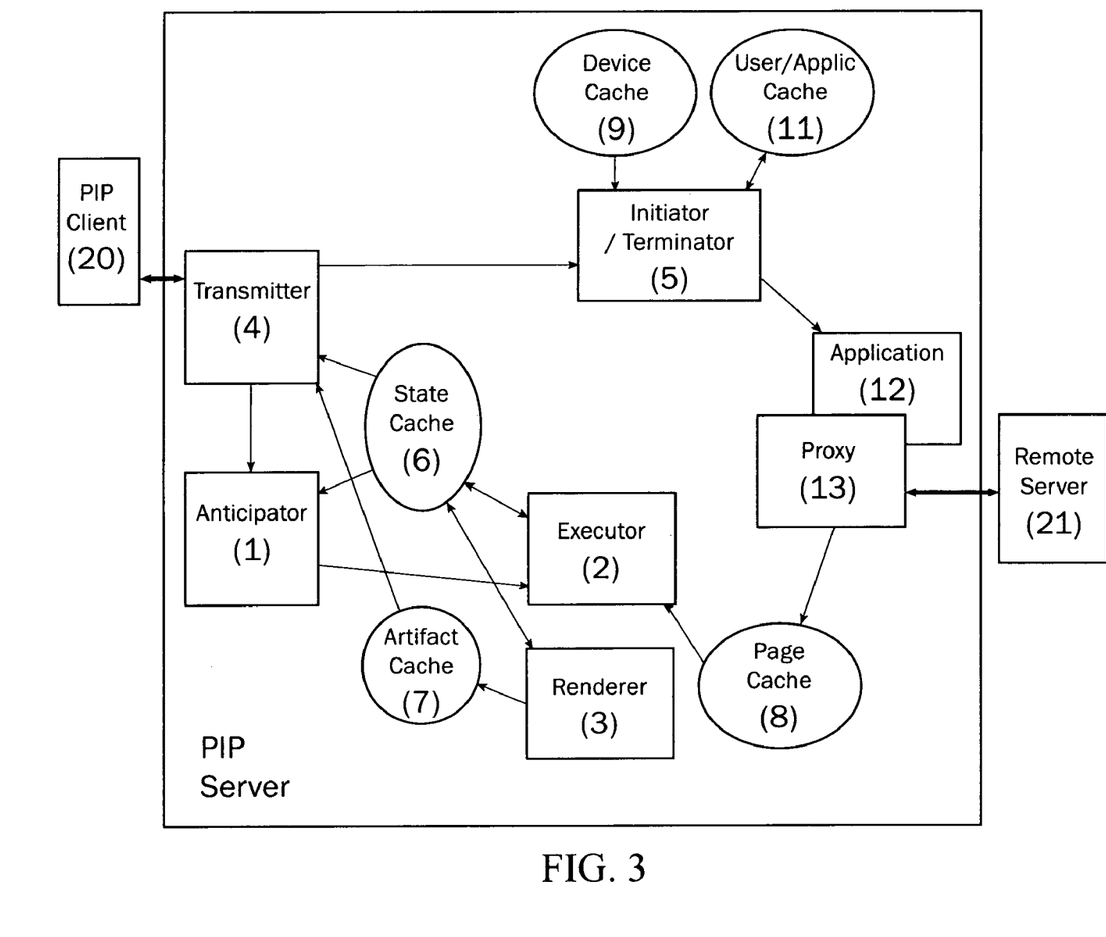
FIG. 3 is a schematic diagram of an exemplary server in accordance with exemplary embodiments disclosed herein.

FIG. 3 is a schematic diagram of an exemplary server in accordance with exemplary embodiments disclosed herein. As discussed above, the server can be implemented in hardware or software. Generally, the server comprises five general modules: an anticipator (1), an executor (2), a renderer (3), a transmitter (4), and an initiator/terminator (5).

The anticipator may be configured to respond to client state requests and anticipate future state requests. When the client device (i.e., the user device) first makes contact with the server and is validated by an authentication means, the anticipator causes to be generated and then commences transmission of a page instance—which, in exemplary embodiments, may comprise a page impression (which itself may comprise of layers) and a state transmission table. The anticipator then, according to internally defined rules and the current state, determines the order of transmission of data from the proxy server to the client. The current state is defined by the last requested state requested by the client. Using this as a guide, the anticipator determines which page instances (or states) ought to be sent to the client—starting with the current page and then any pages that can, through the mechanism of the state transition table, be accessed from the current state. A typical algorithm for determining the transmission priority will be to transmit in order, those states that can be directly accessed from the current state, followed by each state that can be accessed from each of those states, followed in turn by further states that can be accessed. The anticipator may optionally apply additional rules to further rank states, (e.g., rules designed to predict the more likely user input or actions and rank those states higher for transmission). The anticipator may also only partially send a given page impression so that more partial impressions can be sent than could be sent if full impression are sent. The remainder of any impression might then be sent at a lower priority rank.

The executor is initiated by the anticipator and generates new states and state transition tables. The source application page and a current state are generally provided as inputs to the executor. When requested to do so by the anticipator, the executor interprets an application source page to determine the possible alternative states that might arise from the current state as a result of user input or other stimuli. Taking as an example an application page that represents a large document through which the user can navigation both horizontally and vertically, and given as a starting point, the top left of that document, the executor may determine that the possible alternative states arising from the current state are two—one being the current state, but displayed downwards, and the other, the current state but displaced to the right. The amount of the displacement in each direction being determined by the application (the scrolling increment). As a result of the executor function, a state transition table may be generated as part of the current state, and the two new states may be written to the state map.

The renderer determines how page impressions are transmitted to the client, taking as an input a specified page instance and the application page description. The renderer may generate as an output, a set of instructions that will result in an impression of a state being rendered on the client device. As necessary, the renderer may cause artifacts to be written to the artifact cache, also for transmission to the client. The renderer may describe the impression in terms of a set of data that will be acted upon by executable code segments (e.g., code segments executed on the client) and a set of artifacts that will also be rendered by the code segments on the client. The renderer may also optionally describe the impression in terms of modifications of other impressions—the description in that case being a representation of the difference between one impression and another.

The transmitter may be a continuously operating process that causes data generated that has been requested by the anticipator, to be transmitted to the client. The transmitter regulates and initiates the operation of the anticipator, to generate data as required to send the client.

The server may, in exemplary embodiments, also contain four major caches and/or databases: the page instance or state map (6), the artifact cache (7), the page cache (8), and the device database (9).

The page instance or state map stores page state information and shares it's indexing system with the client. The state cache has entries for every page instance or state that has been generated by the proxy server either as a result of a client request or as a result of the operation of the anticipator. The state map entries may comprise a URL (which refers to some application source page), some state information (which defines some state of that application page—for example the current scroll position), the state transition table which maps inputs (e.g., keystrokes, etc.) to other states and a progress value that records what portion of the page has been transmitted to the client device.

The artifact cache is a storage means that records and indexes each artifact that may be necessary to render each page impression associated with each page state stored in the state map. The artifact cache is populated by the renderer as it generates each page impression and is read by the anticipator as it prioritizes and mediates transmission of the data from the server to the client (e.g., the user device).

The page cache is a storage means that records the source application pages. The page cache may be read and interpreted by the executor to generate key maps (or state transition maps) as page instances are generated, and by the renderer as page impressions are generated. The page cache may operate in a read through mode. For example, if a read is attempted for a particular page that is currently not in the cache, the page may be automatically read from the applications, cached and passed through to the requester.

This device database is a memory that stores metrics about client devices. These metrics determine such factors as the input and output capabilities of the device which in turn affect how the anticipator, renderer and executor perform their functions.

During operation, the client device may contact the server to initiate a session. An authentication means may exist to restrict and allow communication between the client and the proxy server. The server may identify the user using identification of the client, through a login process or other means.

Once the client is identified, metrics may be retrieved from the device database to determine the input and output capabilities of the device. Details obtained may include the display size and its properties, keyboard details, scroll wheel, cursor, speakers, Bluetooth, infrared etc.

In exemplary embodiments, the client initiates a request to the server (10) to execute an application or to open a web page. The request is received by the transmitter (4) and passed to the initiator/terminator (5). The initiator/terminator checks in a database (11) to determine if there is specific data for the user relating for the application. This may be cookie data, settings, the user's home page etc or data stored relating to an earlier session. This data may be included in the requests sent to a remote server, passed as parameters into the application or retained for later use within the application. For some applications the application may be re-opened in the state when the user last left it or using the web page last viewed.

The initiator/terminator may start an application (12) on the server which may be stored on the server or downloaded from another server. Alternatively it may instruct the proxy (13) to contact a remote server where the application is run or to a web server request web pages. Web pages may be cached by the proxy or may be downloaded whenever required. Output from the remote server is received in some markup language. All pages are written to the Page Cache (8).

Figure 4:
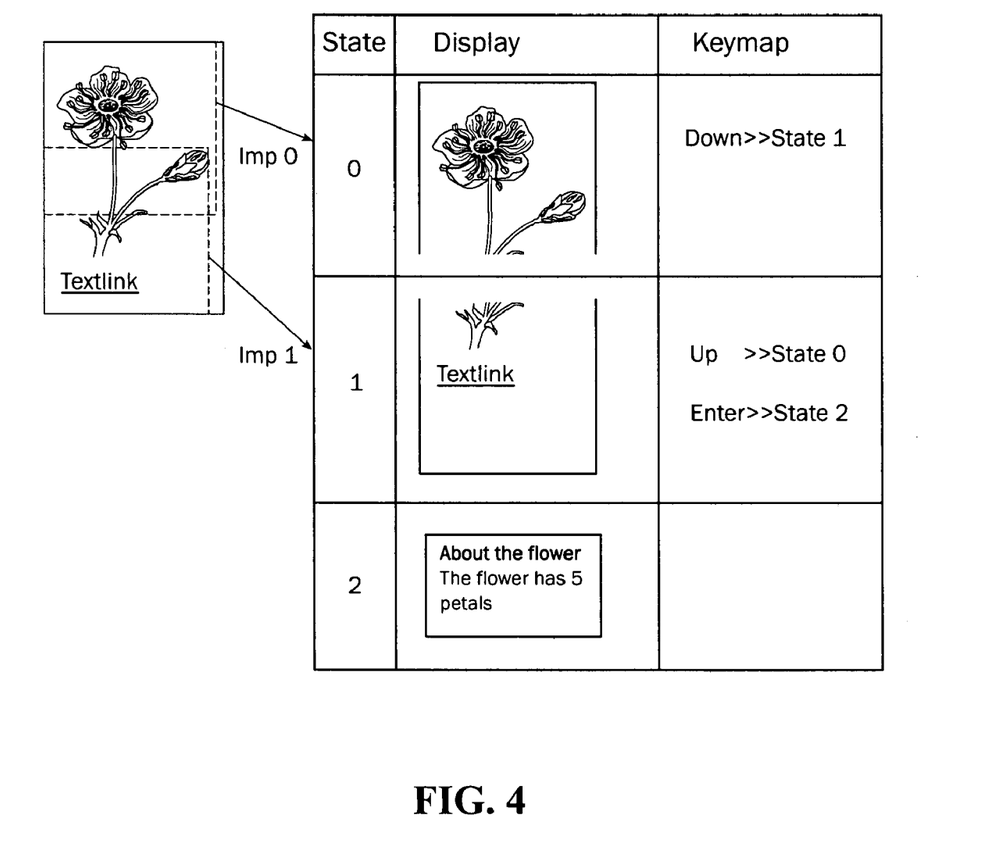
FIG. 4 is a schematic diagram of an exemplary conversion from a page to a state in accordance with exemplary embodiments disclosed herein.

With reference to FIG. 4 (which is a schematic diagram of an exemplary conversion from a page to a state in accordance with exemplary embodiments of the inventions disclosed herein), the Executor (2) takes the first page from the Page Cache (8) and graphically renders the first page (e.g., the flower with associated text). It then determines the initial area of the first page (e.g., the top portion of the page) that can be displayed on the client device and this is established in the state cache (6) as state 0.

The executor (2) determines how it can render the remainder of the first page on the client device as a series of impression. Typically the executor may break the page into a set of adjacent impressions that may, or may not overlap. Alternatively impressions may represent a zoom into the initial low resolution image. Each new impression identified is established in the state cache (6) as a new state.

The executor (2) determines what active elements are within each impression. These may be buttons, hypertext links, dropdown lists, enterable fields etc. For each active element the executor (2) determines how the user can navigate to them using the input capabilities of the device. There are a number of ways this can be implemented. Navigating down may jump a cursor from active element to active element. Alternatively the server can build a new state which the user can enter using a specific 'hot key'. In this new state which visually links each active element with a keypad number and duplicates this in the keypad to state mapping defining that state so that an element is selected or activated when the key is pressed. For example, an impression containing five hypertext links may be established as state 8. In this state the links cannot be selected. However, a hot key, say key 0, is setup to take the device to state 9. The definition of state 9 can draw a small menu over the impression of state 8 linking the 5 links (each given a number from 1 to 5). The definition of state 9 links the keys 1-5 to new states 10-14. Each of the states 10 to 14 may contain the content at the end of the corresponding hypertext links.

The executor (2) accepts elements within the markup languages that allow the page designer to control the mapping of active elements to specific keypad keys. For example, each hypertext link may be pre-assigned a number through the markup language and when that key on the keypad is pressed the hypertext link may be followed. As the page is originally rendered the appropriate numbers can be built into the display.

The executor (2) may determine how the screen may look when any action is taken by the user. For example, if a user action would open a dropdown list, the server might extract the list of allowed options and determine how to render the list (which is established as a new state).

The executor (2) may then attempt to build the state transition table which encapsulates the navigation and logic of the application. In particular, the executor (2) may determine how each input on the client device (e.g., each keypad button) will move the device to one of the new states. For example, whether moving down with a scroll wheel will move a cursor to a new active element on the initial impression or to page down to the impression immediately below. Each such association is recorded as a mapping of an input or keystroke to a new state in the state transition table.

The executor (2) may also determine which states the user can navigate to directly from the impression, typically these are the impressions immediately to the right and below the impression but may be in any direction. They may also be states associated with selecting an active element such as a hypertext link. The server builds the state transition mapping for the state associating different keystrokes or navigation action with other states. The mapping may support various inputs including, for example, scroll wheel movement, tapping on an areas of screen or a voice command. Not every key must be mapped. Not mapping a key effectively turns it off while in that state.

The server can establish new states to effect behavior on the server. For example, pressing the 2 key may simply make the character 'a' appear in an input field on the display while reassigning it so a second push will make a 'b' appear. This will affect a form of text input.

The server may recognize special extensions to markup languages that allows the page designer to mark active elements that should not be followed or activated by the server until explicitly selected by the user. Some active elements within the page may never be followed by the server. Extensions to the markup language can tell the server to ignore the normal display option that a normal browser displays and to present an alternative dialogue. For example, where there is a field for the user to type into, an alternative dialogue could implement an 'auto reduction' from a discreet list of options that the server can obtain from another source.

In exemplary embodiments, the renderer (3) may take states from the state cache (6) and break the image or impression into a set of small images or elements which it stores in the artifact cache (7). It may determine which images or elements are already stored in the artifact database and re-use them whenever possible.

Additionally, for each state, the server may determine the difference between the new state and a proceeding state. The renderer (3) may redefine the image or impression in terms of a previous state plus the overlaying of components in the artifact cache. If a page is very different from all other states it may be established as a base line state.

As discussed above, the server contains an 'anticipator' (1) which uses a prediction algorithm to determine the next impression or state that should processed by the executor (2), renderer (3) or transmitter (4). It will typically prioritize the states that the user is most likely navigate to from the current state on the client device.

The anticipator may constantly adjust priorities based on various factors including: the current state on the device, recent navigation, estimated time required to process a state, and latency experience to send the data stream to the client device. As the user moves from one state to another the anticipator may review the states that it has placed in the state cache and re-prioritize the order in which they should be processed or sent to the client device. The anticipator may be self throttling so as to stay a number of states ahead of the current state down any navigation path.

In exemplary embodiments, the transmitter (4) may control the delivery of the data stream to the client (20). The transmitter works through the state cache following the transmission priority that is set by the anticipator (1). The transmitter ensures that all the artifacts associated with a state have been sent or are sent to the client device. The transmitter may combine many states and artifacts into one packet to maximize transmission efficiency.

The transmitter (4) receives all responses from the client device (20). The responses primarily contain notification as the client moves from one state to another. The responses can be data about the quality of the data which the transmitter can use to regulate the flow of data it is transmitting. It may also contain details of lost packets and request for retransmission etc. This feedback may allow exemplary embodiments to be run over, for example, UDP networks.

Lastly, the client (20) may notify the transmitter (4) that the application is terminating. In response, the initiator/terminator may write necessary data back to the user/application database and update it accordingly.

The client (i.e., the user device) may, in exemplary embodiments, be a software program used to deliver application-like functionality to a wireless mobile device. The application functionality can be a fully functioning interactive application (e.g., a pocket calculator or a more complex example being an email client), or just a navigable document, such as a web page.

The client has access to a memory (e.g., a cache) which may be non-volatile i.e., data is not lost from the cache between running instances of the client. The client can write to and read from the memory. The memory may be divided into the sections of an artifact cache, a state cache and a code cache. Each cache may be structured and index by means (e.g., an index number) that can be used to lookup any element in the cache when required.

The client has access to an input means (e.g., a keypad or touch screen on a mobile phone) and output means (e.g., the screen of a mobile phone and a communication channel such as a GPRS channel or similar data channel available on the mobile phone).

For each state stored in the state cache (including state zero), there may exist either one or a multiple set of data elements (e.g., layers). Each layer may comprise a set of data, one element of which is an index into the code cache, another element of which is a state transition table and a final element may be operation data for a code interpreter.

The state transition table may comprise an indexed table where the index is the set of possible inputs (e.g., key presses on a keyboard) or device generated events (e.g., timer expiration events) and the data elements of which are indexes into a state store.

The code cache can store a multitude of indexed code segments that can be executed by a code interpreter. The code interpreter can execute a code segment on demand and can be supplied with operational data (as stored in a layer) and provide an output means which will be written to as the code is executed. The code interpreter also has access to the input means that it can read.

The artifact cache can store data elements that represent outputs that can be rendered on the output means. If one of the output means is a graphical screen, the artifact cache can store graphical images that can be rendered on that screen. If the output means include a speaker, the artifact cache can also store sound.

The client functions by establishing a wireless data connection to a server upon initialization. Data received from the data connection is interpreted as data that should be stored in any of the three caches or as instructions to remove or modify data from any of the three caches. Simultaneously, from the non-volatile memory store, the client attempts to fetch data relating to the initial state, which is referred to as state zero.

If the cache for state zero is not empty, the client will then fetch the data for the first layer in the state. Using the reference stored in the first layer data, the client fetches the code segment identified and loads the code segment into the code interpreter. The client also fetches the operational data from that layer and provides that data to the code interpreter.

The code interpreter then runs the loaded code that then operates on the loaded data, which may typically result in the code interpreter sending to the output means, instructions and artifacts that are then rendered on the output means.

The code interpreter may continue to run indefinitely until self terminated (i.e. by the code itself executing a terminate instruction) or until a new state is fetched from the state cache. The process may be repeated for each layer in the currently fetched state.

Simultaneously, the client may await inputs from the input means. When an input is received, the client fetches the state transition table for the current state and attempts to look up the state as referenced by the received input. If the lookup is successful—i.e. a state transition table exists and it contains an entry for the received input, the client may then examine if an entry exists in the state cache for the referenced state. If such an entry exists, the client may terminate all executing code segments, and fetch the new state from the cache and repeat the above process.

If the cache does not contain such an entry, the existing code segments may continue to run until an entry for the referenced state is received on the open data channel. In the interim, further input from the input means may result in further output to the output means as controlled by the code interpreter and the received input.

For each attempt to fetch a new state (as referenced by a state transition table), the client sends a transmission on the open data channel, indicating which state is being fetched. This state information is subsequently received by the proxy and is interpreted by the anticipator function of the proxy.

Operation may continue in the above fashion indefinitely or until an instruction is received from the proxy to terminate the session. At that time, the open data channel may be closed and the client operation suspended until either an internally generated event occurs (e.g., a timer expiry), or a connection request is initiated by the proxy, or a user input is received. When any of those occur, the data channel may be opened and the operation resumed from the current state (or an initial state). During the suspended state, the content of the non-volatile memory may be retained along with the currently fetched state.

Although the inventions have been described with reference to particular examples it should be appreciated that it may be performed in many different ways. For instance, the inventions can be used for applications where large documents are required to be uploaded to the mobile device such as a map based location application where a map that extends over many pages must be uploaded. In this case the first page may contain the area the user wishes to see first, or it may be a large scale map. After the first pages is sent then the surrounding pages, or pages that cover the same terrain in greater detail, may be sent as the next generation of states and displayed as subsequent pages on the user device.

The embodiments described herein are intended to be illustrative of the disclosed inventions. As will be recognized by those of ordinary skill in the art, various modifications and changes can be made to these embodiments and such variations and modifications would remain within the spirit and scope of the inventions defined in the appended claims and their equivalents. Additional advantages and modifications will readily occur to those of ordinary skill in the art. Therefore, the present disclosure in its broader aspects is not limited to the specific details and representative embodiments shown and described herein.

What is claimed is:

1. A non-transitory, processor readable medium having instructions stored therein for causing a user device to execute a method of providing applications style functionality to a user, the method comprising:
    communicating to a server a request identifying an application;
    receiving data from the server, wherein the data includes first display instructions for a first state of the application, a state transition table identifying a set of states that are linked to the first state, and storage instructions defining a memory location for storing the first display instructions and the state transition table in a memory of the user device;
    storing the first display instructions and the state transition table at the memory location based on the storage instructions;
    rendering the first state for the user;
    receiving additional data from the server, wherein the additional data includes second display instructions for a second state of the application, wherein the second state is identified in the state transition table, and wherein the additional data is received without requiring input from the user.

2. The processor-readable medium of claim 1, wherein the user device is a mobile phone or a PDA.

3. The processor-readable medium of claim 1, wherein the first state is a first HTML web page and the second state is a second HTML web page linked to the first HTML web page.

4. The processor-readable medium of claim 1, wherein the first state is a small section of a page and the second state is an adjacent area of the page.

5. A non-transitory, processor-readable medium having instructions stored therein for causing a server to perform a method comprising:
    receiving from a user device a request identifying an application;
    obtaining first display instructions for a first state of the application, a state transition table identifying a set of states that are linked to the first state, and storage instructions defining a memory location for storing the first display instructions and the state transition table in a memory of the user device;
    transmitting data to the user device, wherein the data includes the first display instructions, the state transition table, and the storage instructions;
    transmitting additional data to the mobile terminal, wherein the additional data includes second display instructions for a second state of the application, wherein the second state is identified in the state transition table, and wherein the additional data is transmitted without requiring a further request from the user device.

6. The processor-readable medium of claim 5, wherein the server comprises:
   an encoder for encoding the data;
   a transmitter for transmitting the encoded data for reception by the user device; and
   a storage device for maintaining a record of the contents of the memory in the user device after reception of the encoded.

7. The processor-readable medium of claim 6, wherein the server receives information regarding changes in state from the user device, and wherein the server anticipates future states and encodes the future states into subsequent data transmissions to the user device.

8. The processor-readable medium of claim 5, wherein the first state is a first HTML web page and the second state is a second HTML web page linked to the first HTML web page.

9. The processor-readable medium of claim 5, wherein the first state is a small section of a page and the second state is an adjacent area of the page.

10. A server configured to provide application style functionality to a user device comprising:
    a communication interface configured to receive a request from a user device identifying an application;
    an anticipator module, stored in a non-transitory memory configured to receive the request from the communication interface and obtain first display instructions for a first state of the application, a state transition table identifying a set of states that are linked to the first state, and storage instructions defining a memory location for storing the first display instructions and the state transition table in a memory of the user device;
    wherein the anticipator module transmits data including the first display instructions, the state transition table, and the storage instructions to the communication interface, such that the communication interface transmits the data to the user device; and
    wherein the anticipator module transmits to the communication interface additional data including second display instructions for a second state of the application, wherein the second state is identified in the state transition table, and wherein the communication interface transmits the additional data to the user device without requiring a further request from the user device.

11. The server of claim 10 further comprising a storage device for maintaining a record of the contents of the memory in the user device.

12. The server of claim 10 further comprising an executor module, wherein the executor module is configured to generate a new state transition table and communicate the new state transition table to the anticipator module.

13. The server of claim 10 further comprising a renderer module, wherein the renderer module is configured to generate new display instructions for a new state of the application and communicate the new display instructions to the anticipator module.

* * * * *